US008402463B2

(12) United States Patent  
Norton et al.

(10) Patent No.: US 8,402,463 B2  
(45) Date of Patent: Mar. 19, 2013

(54) HARDWARE THREADS PROCESSOR CORE UTILIZATION

(75) Inventors: Scott J. Norton, San Jose, CA (US); Hyun Kim, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1901 days.

(21) Appl. No.: 11/554,566

(22) Filed: Oct. 30, 2006

(65) Prior Publication Data

US 2008/0104610 A1   May 1, 2008

(51) Int. Cl.  
*G06F 9/46* (2006.01)  
*G06F 9/30* (2006.01)

(52) U.S. Cl. .......................... 718/100; 712/216

(58) Field of Classification Search .................. 718/100; 712/216  
See application file for complete search history.

(56) References Cited

U.S. PATENT DOCUMENTS

| | | | | |
|---|---|---|---|---|
| 5,452,237 | A * | 9/1995 | Jones, Jr. | ........................ 702/26 |
| 7,058,948 | B2 | 6/2006 | Hoyle | |
| 8,010,337 | B2 * | 8/2011 | Narayanan et al. | ............ 703/22 |
| 2002/0007387 | A1 | 1/2002 | Ginsberg | |
| 2005/0050305 | A1 | 3/2005 | Kissell | |
| 2005/0125795 | A1 | 6/2005 | Kissell | |
| 2005/0166039 | A1 | 7/2005 | Wang et al. | |
| 2006/0212269 | A1 | 9/2006 | Lee et al. | |
| 2006/0212867 | A1 | 9/2006 | Fields et al. | |

OTHER PUBLICATIONS

J.M. Borkenhagen, et al., A multithreaded PowerPC processor for commercial servers, IBM J. Res. Develop., vol. 44, No. 6, Nov. 2000, pp. 885-898.
Wikipedia, Central processing unit, http://en.wikipedia.org/wiki/Cpu, 2006.
Linux Device Driver Programmer's Guide-Porting to SGI Altix Systems, Chapter 11. Time Management, sgi, 007-4520-006.
Wikipedia, Context switch, 2006.
Intel® Itanium® 2 Processor Specification Update, 251141-035, Jul. 2005.
Mario Aldea Rivas, et al., MaRTE OS: An Ada Kernel for Real-Time Embedded Applications, Proceedings of the International Conference on Reliable Software Technologies, 2001.
Using the interval timer counter on Intel® Itanium® for measurements, Hewlett-Packard Development Company.
Paul Demone, Real World Technologies—Alpha EV8 (Part 2): Simultaneous Multi-Threat, Dec. 26, 2000.
Patrick Crowley et al., Worst-Case Execution Time Estimation for Hardware-assisted Multithreaded Processors, Proc. of the 2nd Workshop on Network Processors, 2003.

* cited by examiner

*Primary Examiner* — Mengyao Zhe

(57) ABSTRACT

A determination of processor core utilization by a plurality of hardware threads over a time interval is made through a division of a length of the time interval by a total count of the plurality of hardware threads.

22 Claims, 5 Drawing Sheets

HARDWARE THREADS PROCESSOR CORE UTILIZATION

BACKGROUND

Multithreaded hardware computer architecture may have an Interval Timer Counter (ITC) shared by two or more hardware threads on a same processor core, for example, a CPU (central processing unit) core. The ITC advances irrespective of which hardware thread is executing on the processor core. An operating system (OS) for the processor core has no control over context switch events of the hardware threads. For example, an operation available to the hardware threads comprises a simple yield instruction such as hint@pause or PAL_HALT_LIGHT. Measurements are not performed on a per-hardware thread basis. An inability to accurately measure core execution time and core utilization from algorithms based on the ITC result in a double counting of execution time and a doubling of core utilization metrics, for example, for two hardware threads.

DESCRIPTION OF THE DRAWINGS

Features of exemplary implementations of the invention will become apparent from the description, the claims, and the accompanying drawings in which:

DETAILED DESCRIPTION

Figure 1:
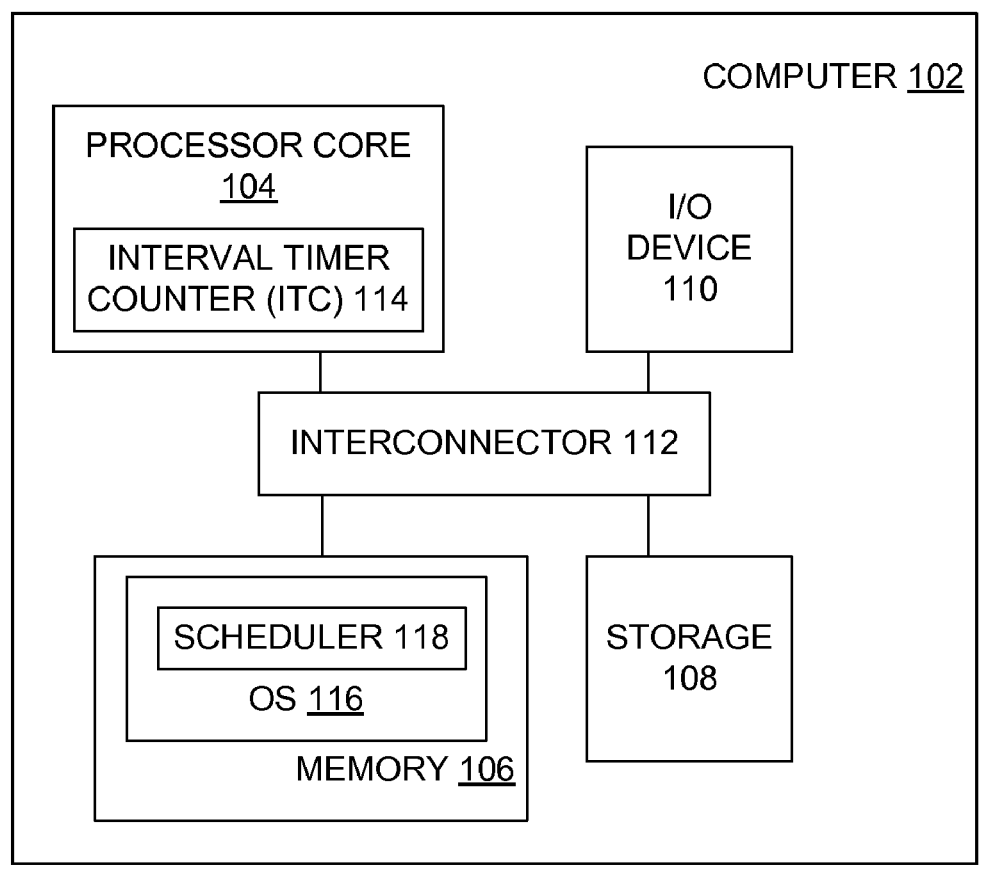
FIG. 1 is a representation of an implementation of an apparatus that comprises a computer that comprises a processor core, a plurality of memory locations, one or more I/O (input/output) devices, and one or more interconnectors, and illustrates exemplary memory with an exemplary operating system (OS) that comprises an exemplary scheduler according to a preferred embodiment of the invention.

Referring to the BACKGROUND section above, a computer architecture such as an exemplary multithreaded hardware architecture with an Interval Timer Counter (ITC) shared by two or more hardware threads on the same processor core, lacks an ability to acceptably, desirably, and/or accurately account for actual time of core execution and core utilization by each hardware thread. Exemplary causes comprise the ITC advancement irrespective of which hardware thread is executing on the processor core, for example, CPU (central processing unit) core, and/or the randomness of hardware thread context switching. An exemplary operating system (OS) for the processor core has little or no control over context switch events of the hardware threads.

An exemplary approach divides the time of execution of the hardware threads by the total number of hardware threads to make a determination of execution time per hardware thread. The time of execution may comprise the time accumulated in the ITC for machines that do not have a per-hardware thread ITC that would otherwise accumulate time only when a particular hardware thread is executing.

An exemplary operation available to the hardware threads comprises a yield instruction, for example, hint@pause or PAL_HALT_LIGHT. When a hardware thread performs a yield operation, the yielding hardware thread in an example is incorrectly charged for execution time on the core during the yield operation. The other hardware thread that received utilization of the core in an example is charged only for a portion of the time it actually consumed. The yield operations on exemplary multithreaded hardware cause inaccuracies in measuring how much time a hardware thread consumed a processor core.

An exemplary implementation charges back to the receiving hardware thread on the processor core, the time spent in the yield operation, for example, to increase and/or improve accuracy in time accounting. An exemplary implementation accounts for the time a hardware thread spends in a yield operation to obtain actual core execution time and core utilization for both the yielding and receiving hardware threads. An exemplary implementation employs a running execution time counter and an adjustment factor counter for each hardware thread.

When a hardware thread executes a yield operation, the hardware thread in an example stores the current time value. When the hardware thread resumes execution, the hardware thread in an example subtracts the previously saved time value from the updated current time value to determine the time that was spent while yielding to the other hardware thread. An exemplary implementation arranges to subtract the yielding time from an execution time count for the yielding hardware thread, and add the yielding time to an execution time count for the receiving hardware thread.

An exemplary implementation subtracts the yielding time from an adjustment factor counter for the yielding hardware thread, and adds the yielding time to the adjustment factor counter for the receiving hardware thread. An exemplary implementation employs the adjustment factor counters to calculate the core execution time and core utilization for the yielding and receiving hardware threads. When each hardware thread calculates its own time accounting and core utilization for the task it is running, the hardware thread in an example adds the adjustment factor counter to the running execution time counter to determine the actual execution time. An exemplary implementation increases and/or improves accuracy in time accounting when multithreaded hardware yield operations are allowed.

Turning to FIG. 1, an implementation of an apparatus 100 in an example comprises one or more computers, computer systems, and/or computing devices. An exemplary implementation comprises a computer 102 that comprises a processor core and/or core resource 104, a plurality of memory locations and/or disk drives such as one or more of memory 106 and/or storage 108, one or more I/O (input/output) devices 110, and one or more interconnectors 112. An exemplary processor core 104 comprises an interval timer counter (ITC) 114. An exemplary memory 106 is employable to store programs and data during operation of the computer 102. The memory 106 in an example serves to store an operating system (OS) 116 that comprises a scheduler 118. An exemplary interconnector 112 serves to couple components of the computer 102. The interconnector 112 in an example may comprise one or more busses and/or networks, for example, to enable communications to be exchanged between components of the computer 102.

One or more components of the apparatus 100 and/or the scheduler 118 comprise an exemplary implementation of an algorithm, procedure, program, mechanism, engine, model, coordinator, module, application, code, and/or logic. An exemplary component may be implemented as kernel-resident and/or operating-system-resident logic and/or may comprise user-level programs, for example, user interface logic residing in user-level program files with additional and/or remaining logic residing in the kernel and/or underlying operating system.

Figure 2:
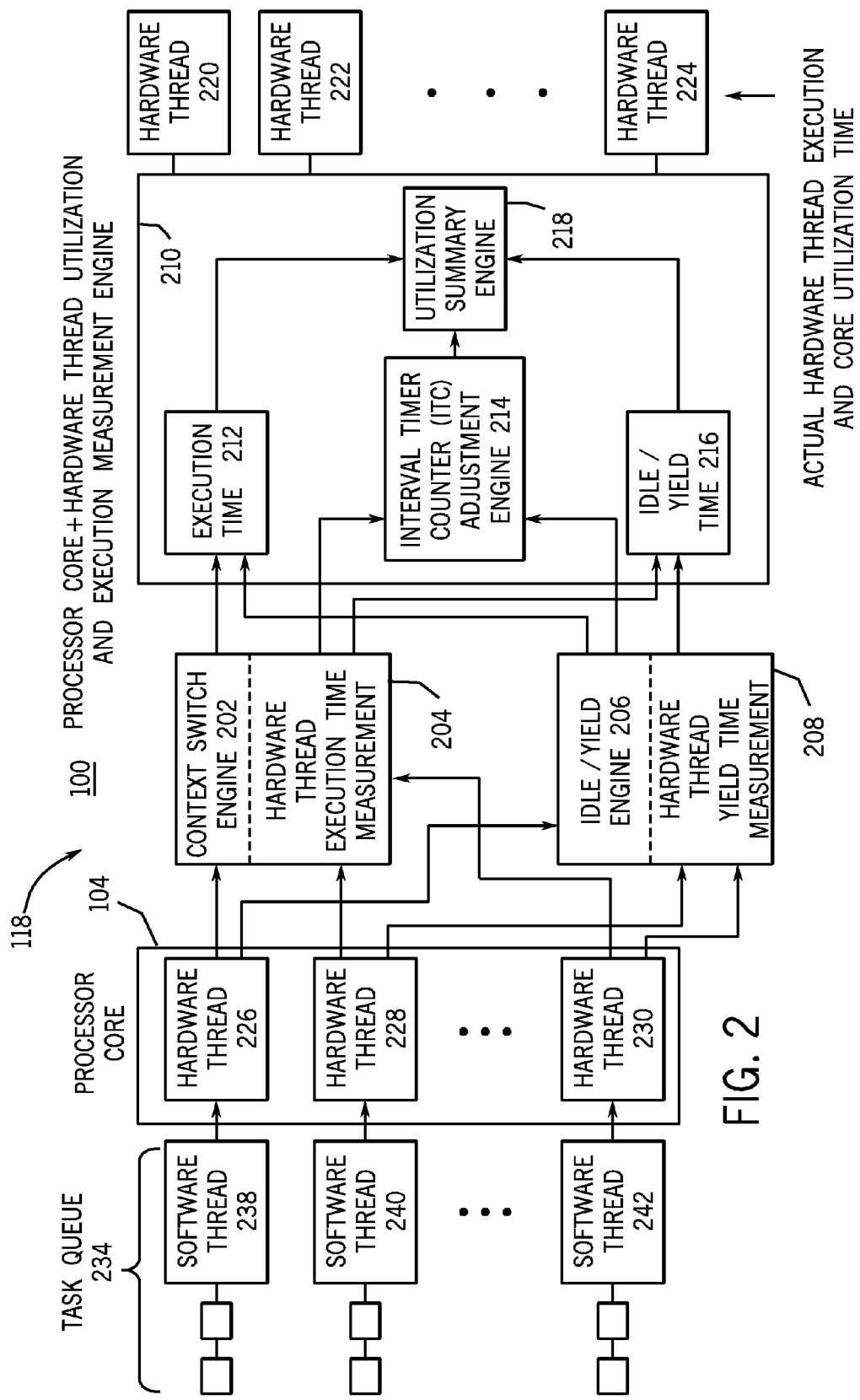
FIG. 2 is an exemplary functional block diagram that comprises the exemplary scheduler of the exemplary operating system (OS), and illustrates exemplary output of a determination of a plurality of actual hardware thread execution and core utilization times for a respective plurality of hardware threads that processes a plurality of software threads from a task queue on the processor core of an implementation of the apparatus of FIG. 1.

Turning to FIG. 2, the scheduler 118 in an example comprises one or more components, for example, a context switch engine 202, a hardware thread execution time measurer 204, an idle/yield engine 206, a hardware thread yield time measurer 208, and/or a processor core and hardware thread utilization and execution measurement engine and/or utilization measuring facility 210. The hardware thread execution time measurer 204 and/or the hardware thread yield time measurer 208 in an example comprise a running execution time counter. The processor core and hardware thread utilization and execution measurement engine 210 in an example comprises one or more components, for example, an execution time counter 212, an ITC adjustment engine 214, an idle/yield time counter 216, and/or a utilization summary engine 218. An exemplary processor core and hardware thread utilization and execution measurement engine 210 outputs a determination of a plurality of actual hardware thread execution and core utilization times, for example, actual hardware thread execution and core utilization times 220, 222, 224 for a respective plurality of hardware threads, for example, hardware threads 226, 228, 230 on the processor core 104.

The hardware threads 226, 228, 230 in an example independently and/or substantially simultaneously process a plurality of software threads contained in a task queue 234. An exemplary implementation of task queues 234 comprises a respective task queue 234 for each hardware thread 226, 228, 230. The hardware thread 226 in an example processes a set of the software threads 238 followed by zero or more additional software threads of the plurality of software threads 238. The hardware thread 228 in an example processes a set of the software threads 240 followed by zero or more additional software threads of the plurality of software threads 240. The hardware thread 230 in an example processes a set of the software threads 242 followed by zero or more additional software threads of the plurality of software threads 242.

An exemplary OS scheduler 118 comprises the task queue 234, the context switch engine 202, and the utilization measuring facility 210. The task queue 234 in an example maintains the available software thread 238, 240 242 to be executed on the hardware threads 226, 228, 230. The context switch engine 202 in an example controls which software thread 238, 240, 242 executes on which hardware thread, 226, 228, 230. The idle engine 206 in an example performs yield operations when the hardware thread 226, 228, 230 is not utilizing the core resource 104.

The utilization measuring facility 210 in an example maintains and calculates the utilization of hardware resources. The utilizing measuring facility 210 in an example comprises the execution time counter 212, the adjustment engine 214 based on number of hardware threads 226, 228, 230, and the idle/yield time counter 216 that provides the interval time of idling or yielding. An exemplary summary of hardware thread utilization of the core resource 104 is summarized by the utilization summary engine 218, for example, by calculation based on a formula that employs information, output, and/or data from the execution time counter 212, the adjustment engine 214 based on number of hardware threads 226, 228, 230, and the idle/yield time counter 216. The utilization measuring facility 210 outputs hardware threads utilization 220, 222, 224.

In one or more exemplary implementations, one or more features described herein in connection with one or more of the hardware threads 226, 228, and/or 230 and/or one or more parts thereof apply and/or are extendible analogously to one or more of the others and/or one or more other instances of hardware threads in the apparatus 100.

Figure 3:
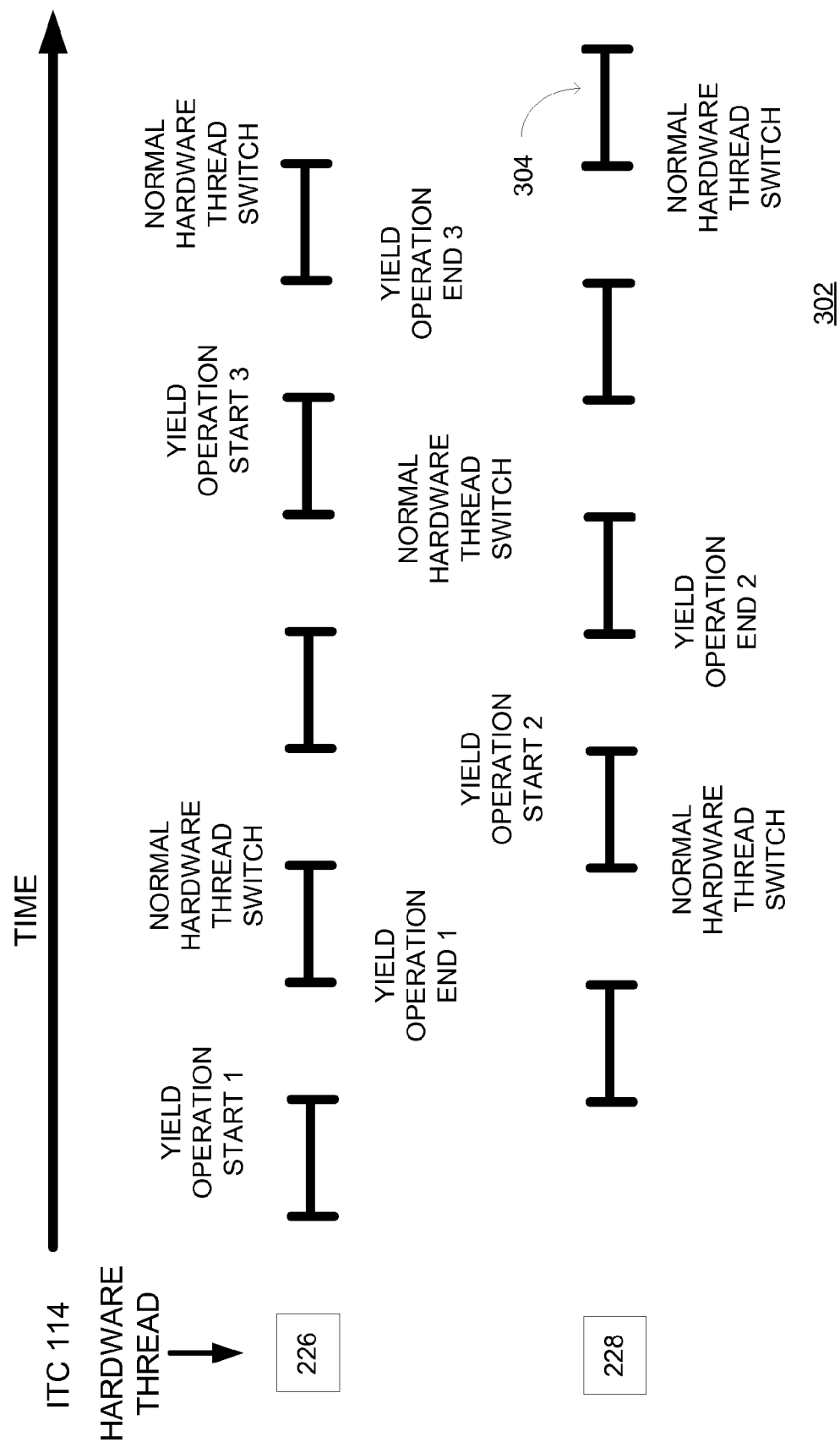
FIG. 3 is a representation of an exemplary flow of utilization of the processor core between exemplary hardware threads of an implementation of the apparatus of FIG. 1.

Turning to FIG. 3, an exemplary flow 302 of utilization of the processor core 104 may occur between exemplary hardware threads 226, 228. An exemplary hardware thread 226, 228 may share utilization of the processor core 104. The hardware thread 226, 228 in an example receives use of the processor core 104 in amounts, slices, and/or lengths 304 of time. The length 304 of time of utilization of the processor core 104 by an exemplary hardware thread 226, 228 may vary. An exemplary implementation may initially offer a uniform length 304 of time switched among a plurality of hardware threads 226, 228. Another exemplary implementation may initially offer a non-uniform length 304 of time switched among each, sets, or all of a plurality of hardware threads 226, 228. The hardware threads 226, 228 in an example may perform yield operations, for example, that change the actual length 304 of time from the initial allocation preliminarily scheduled and/or set, for example, by the hardware or the operating system (OS) 116.

An exemplary "Yield Operation Start" on the flow 302 comprises a start time when a hardware thread 226, 228 executes one of the yield operations. An exemplary "Yield Operation End" on the flow 302 comprises an end or completion that the hardware thread 226, 228 executes the yield operation. Other end points on the flow 302 comprise occurrences of a normal hardware thread context switch.

Figure 4:
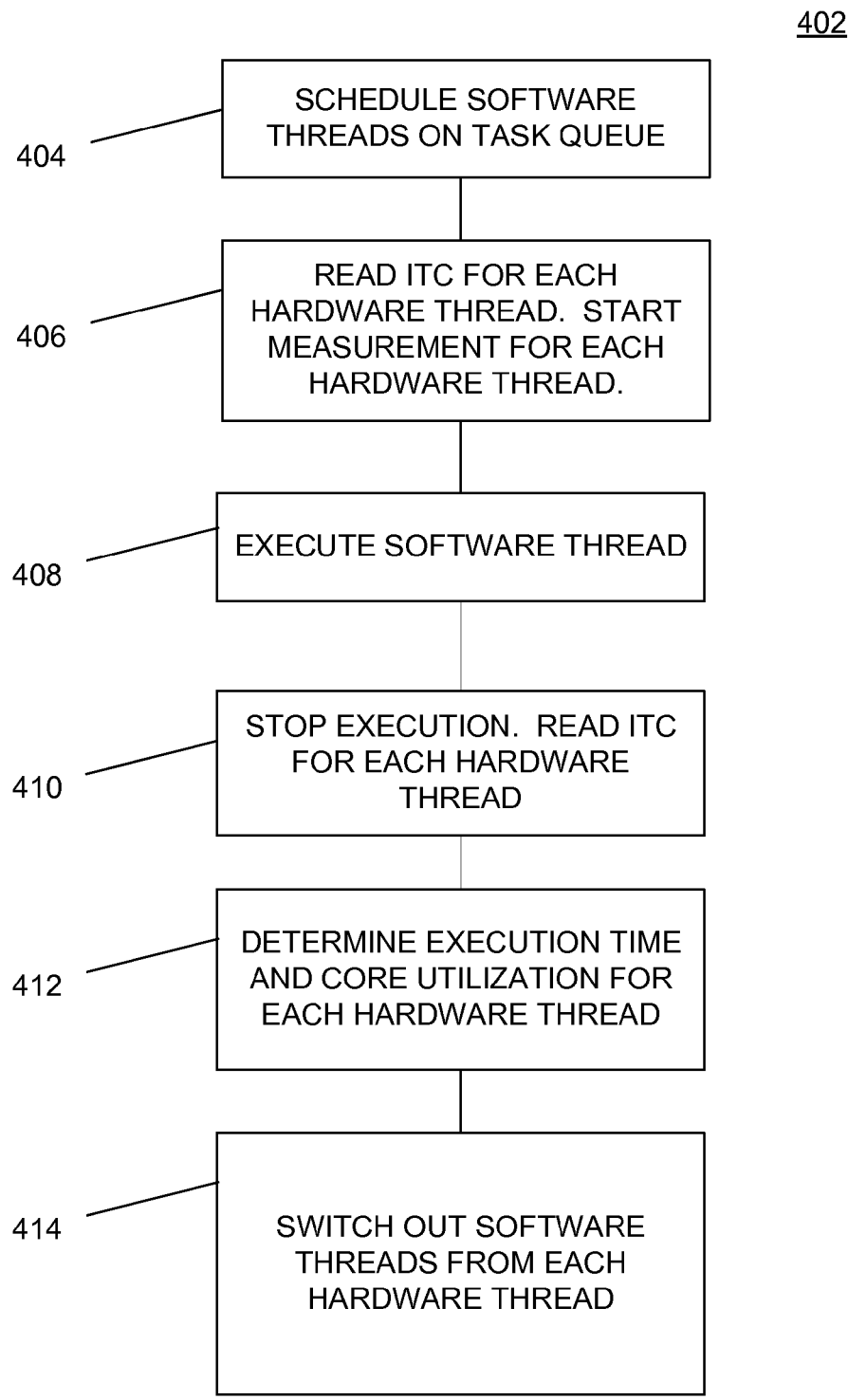
FIG. 4 is a representation of an exemplary logic flow for determination of hardware thread core execution time and core utilization between OS context switches on an implementation of the apparatus of FIG. 1.

An illustrative description of a number of exemplary operations of an implementation of the apparatus 100 is presented, for explanatory purposes. FIG. 4 is a representation of an exemplary logic flow 402 for determination of hardware thread core execution time and core utilization between OS context switches. Referring to FIGS. 3 and 4, in exemplary logic flow 402 at STEP 404, the OS scheduler 118 schedules software threads 232 into the task queue 234. At STEP 406 in an example the hardware thread execution time measurer 204 reads the ITC 114 for each hardware thread 226, 228, 230. At STEP 408 in an example the context switch engine 202 starts executing each software thread 238, 240, 242 scheduled on each hardware thread 226, 228, 230. At STEP 410 in an example the context switch engine 202 stops execution. The hardware thread execution time measurer 204 in an example reads the ITC 114 for each hardware thread 226, 228, 230. At STEP 412 in an example the processor core and hardware thread utilization and execution measurement engine 210 determines execution time and core utilization for each hardware thread 226, 228, 230. An exemplary processor core and hardware thread utilization and execution measurement engine 210 determines the start and stop execution time from the execution time counter 212 and adjusts for the number of hardware threads 226, 228, 230 on the interval time counter (ITC) adjustment engine 214 for the processor core 104. At STEP 414 in an example the context switch engine 202 switches out the software threads 232 from each hardware thread 226, 228, 230.

Figure 5:
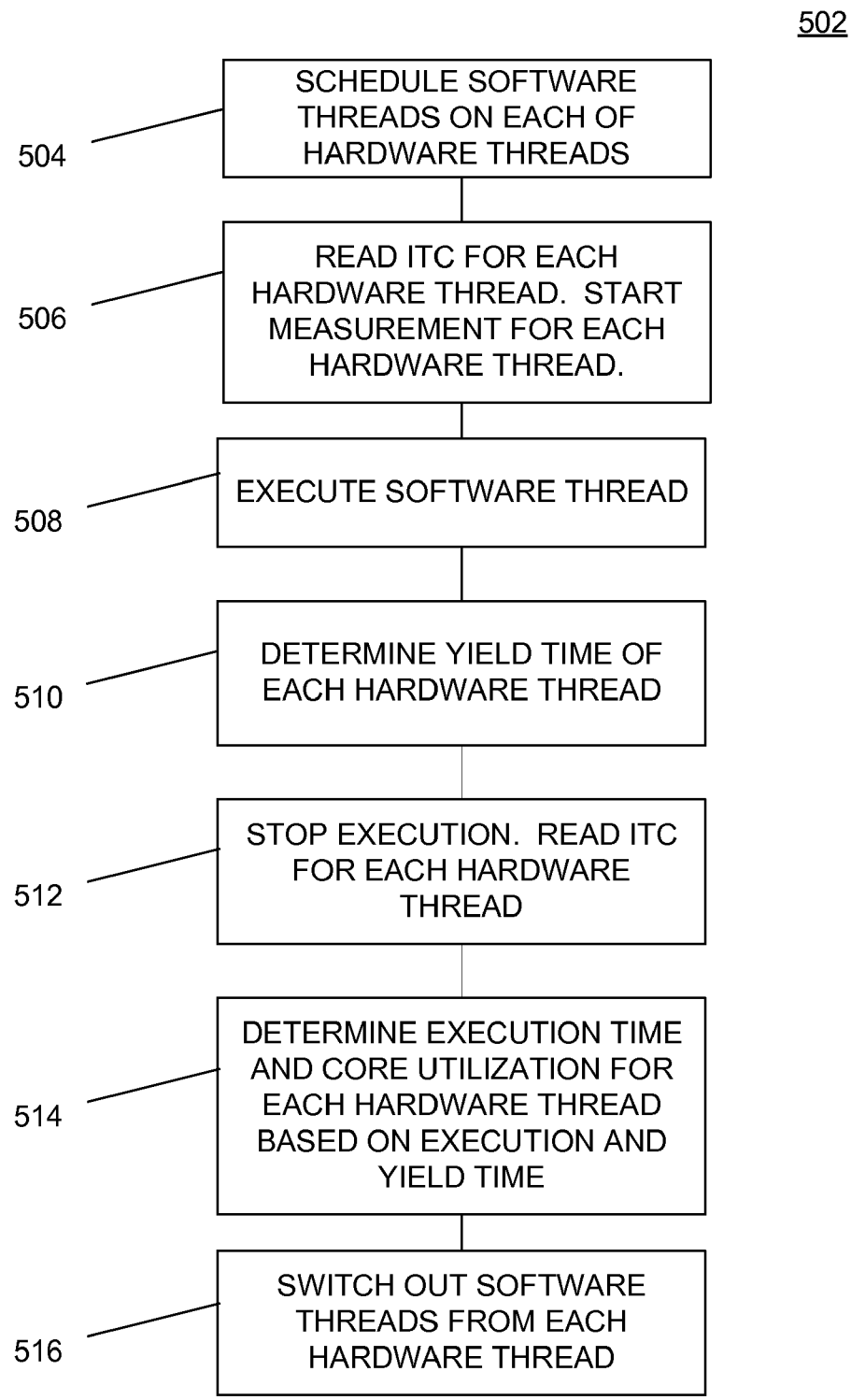
FIG. 5 is similar to FIG. 4 and further employs timer measurements, adjustment time counters, and yield operation time.

FIG. 5 is a representation of an exemplary logic flow 502 for determination of hardware thread core execution time and core utilization between OS context switches based on timer measurements, adjustment time counters, and yield operation time. Referring to FIGS. 3 and 5, in exemplary logic flow 502 at STEP 504, the OS scheduler 118 schedules software threads 232 into the task queue 234. At STEP 506 in an example the hardware thread execution time measurer 204 reads the ITC 114 for each hardware thread 226, 228, 230. At STEP 508 in an example the context switch engine 202 starts executing each software thread 238, 240, 242 scheduled on each hardware thread 226, 228, 230. At STEP 510 in an example the idle/yield engine 206 determines the amount of time the hardware thread 226 yielded execution to another hardware thread 228 as measured by the hardware thread yield time measurer 208. At STEP 512 in an example the context switch engine 202 stops execution. The hardware thread execution time measurer 204 in an example reads the ITC 114 for each hardware thread 226, 228, 230. At STEP 514 in an example the processor core and hardware thread utilization and execution measurement engine 210 determines execution time and core utilization for each hardware thread 226, 228, 230. An exemplary processor core and hardware thread utilization and execution measurement engine 210 determines the start and stop execution time from the execution time counter 212, adjusts for the number of hardware threads 226, 228, 230 on the interval time counter (ITC) adjustment engine 214 for the processor core 104, and adjusts for yield time by each hardware thread 226, 228, 230 in the idle/yield time counter 216 and calculated by the utilization summary engine 218. At STEP 516 in an example the context switch engine 202 switches out the software threads 232 from each hardware thread 226, 228, 230.

An exemplary approach makes a determination of processor core utilization 220, 222, 224 by a plurality of hardware threads 226, 228, 230 over a time interval through a division of a length of the time interval by a total count of the plurality of hardware threads 226, 228, 230.

One or more hardware thread context switches among two or more of the plurality of hardware threads 226, 228, 230 occur over the time interval. A result of the division of the time interval by the total count of the plurality of hardware threads 226, 228, 230 is interpreted as a per-thread processor core utilization 220, 222, 224.

The total count comprises a total count of the plurality of hardware threads 226, 228, 230 on a single processor core 104. One or more hardware thread context switches for utilization of the single processor core 104 occur among two or more of the plurality of hardware threads 226, 228, 230 over the time interval. A determination of utilization of the single processor core 104 by the plurality of hardware threads 226, 228, 230 over the time interval is made through the division of the time interval by the total count of the plurality of hardware threads 226, 228, 230.

The plurality of hardware threads 226, 228, 230 comprises at least a first hardware thread and a second hardware thread of two hardware threads 226, 228, 230 on a single processor core 104. A determination of utilization of the single processor core 104 by the two hardware threads 226, 228, 230 over the time interval is made through division of the time interval by two. At least a first software thread is processed independently by the first hardware thread during the time interval. At least a second software thread is processed independently by the second hardware thread during the time interval.

The total count comprises a total count of the plurality of hardware threads 226, 228, 230 on an operating system (OS) 116 for a single processor core 104. The time interval occurs between successive OS context switches of the OS 116. One or more hardware thread context switches for utilization of the single processor core 104 occur among two or more of the plurality of hardware threads 226, 228, 230 over the time interval. A determination of processor core utilization 220, 222, 224 by the plurality of hardware threads 226, 228, 230 between the successive OS context switches and over the one or more hardware thread context switches is made through a division of the length of time between the successive OS context switches by the total count of the plurality of hardware threads 226, 228, 230 on the OS 116 of the single processor core 104.

One or more hardware thread context switches among two or more of the plurality of hardware threads 226, 228, 230 occur over the time interval. The length of the time interval is divided by the total count of the plurality of hardware threads 226, 228, 230 to make the determination of processor core utilization 220, 222, 224 as a substitute for employment of one or more absent, unselected, and/or unavailable per-hardware thread interval time counters that would otherwise be employable to individually measure processor core utilization 220, 222, 224 by each of the plurality of hardware threads 226, 228, 230.

An exemplary implementation comprises an operating system (OS) scheduler 118 of an OS 116 for a processor core 104 that makes a determination of utilization of the processor core 104 by a plurality of hardware threads 226, 228, 230 over a time interval through a division of a length of the time interval by a total count of the plurality of hardware threads 226, 228, 230.

The time interval occurs between successive OS context switches of the OS 116. Each of the plurality of hardware threads 226, 228, 230 on the OS 116 between the successive OS context switches independently and substantially simultaneously processes a respective set of software threads 238, 240 242. At least one of the sets of software threads 238, 240 242 comprises a plurality of software threads 238, 240 242.

A standard yield occurs when a standard hardware thread does not have a software thread scheduled on the hardware thread, for example, no more tasks are present in the task run queue for the hardware thread. In such a case, the hardware thread enters an idle function in the OS or kernel and spins waiting for something to be put into the task queue. On standard multithreaded or hyperthreaded hardware this means that the one hardware thread that is processing a software thread receives only a fraction, for example, fifty percent in the case of dual hardware threads, of the core resources as the other hardware thread that is spinning in the idle function. The idle hardware thread still consumes the other fifty percent of the core resources basically doing nothing but waiting for work. With yield operations added into the OS idle function, once the hardware thread in the idle function starts executing the yield function, the other hardware thread will start receiving more than fifty percent of the core resources. An exemplary implementation may give the one hardware thread running a software thread on the order of ninety-five percent or more of the CPU resources. Doing this in an example results in breaking and/or reducing the accuracy of the time executing and utilization data collected in the divide by n approach, for example, because the two hardware threads actually have significantly different utilization of the core resource 104. An exemplary approach performs yield start/stop timing and then adds/subtracts this amount from the appropriate execution counters for the hardware threads to obtain, adjust, and/or produce the data. In view of the execution of yield operations, an exemplary implementation tracks the time and updates the execution time counters for the hardware threads.

In an exemplary approach, the plurality of hardware threads 226, 228, 230 comprises at least a first hardware thread and a second hardware thread. The time interval occurs between successive operating system (OS) context switches. The determination of processor core utilization 220, 222, 224 is interpreted as an initial determination of per-thread processor core utilization 220, 222, 224 over the time interval. Multithreaded hardware yield operations from the first hardware thread to the second hardware thread between the successive OS context switches are effected. A determination of a duration of the multithreaded hardware yield operations is made through subtraction of an initiation time value stored upon initiation of the multithreaded hardware yield operations from a completion time value obtained upon completion of the multithreaded hardware yield operations. The duration of the multithreaded hardware yield operations is subtracted from a core utilization counter between the successive OS context switches for the first hardware thread. The duration of the multithreaded hardware yield operations is added to a core utilization counter between the successive OS context switches for the second hardware thread. The initial determination of per-thread processor core utilization 220, 222, 224 over the time interval is combined with the core utilization counter for the first hardware thread to make a determination of total core utilization between the successive OS context switches by the first hardware thread. The initial determination of per-thread processor core utilization 220, 222, 224 over the time interval is combined with the core utilization counter for the second hardware thread to make a determination of total core utilization between the successive OS context switches by the second hardware thread.

Multithreaded hardware yield operations from the second hardware thread to the first hardware thread between the successive OS context switches are effected. A determination of a duration of the multithreaded hardware yield operations from the second hardware thread to the first hardware thread is made through subtraction of an initiation time value stored upon initiation of the multithreaded hardware yield operations from the second hardware thread to the first hardware thread, from a completion time value obtained upon completion of the multithreaded hardware yield operations from the second hardware thread to the first hardware thread. The duration of the multithreaded hardware yield operations is subtracted from the second hardware thread to the first hardware thread, from the core utilization counter between the successive OS context switches for the second hardware thread. The duration of the multithreaded hardware yield operations from the second hardware thread is added to the first hardware thread to the core utilization counter between the successive OS context switches for the first hardware thread. The initial determination of per-thread processor core utilization 220, 222, 224 over the time interval is combined with the core utilization counter for the first hardware thread to make a determination of total core utilization between the successive OS context switches by the first hardware thread. The initial determination of per-thread processor core utilization 220, 222, 224 over the time interval is combined with the core utilization counter for the second hardware thread to make a determination of total core utilization between the successive OS context switches by the second hardware thread.

An exemplary implementation comprises an operating system (OS) scheduler 118 of an OS 116 for a processor core 104 that upon execution of a yield operation of the processor core between successive OS context switches of the OS 116 by a first hardware thread to a second hardware thread of a plurality of hardware threads 226, 228, 230 on the OS: subtracts from a core utilization counter for the first hardware thread a duration of the yield operation of the processor core between the successive OS context switches; and adds to a core utilization counter for the second hardware thread the duration of the yield operation of the processor core between the successive OS context switches.

The OS scheduler 118 upon execution of a yield operation of the processor core between successive OS context switches of the OS 116 by the second hardware thread to the first hardware thread: subtracts from the core utilization counter for the second hardware thread a duration of the yield operation of the processor core between the successive OS context switches by the second hardware thread to the first hardware thread; and adds to the core utilization counter for the first hardware thread the duration of the yield operation of the processor core between the successive OS context switches by the second hardware thread to the first hardware thread.

The OS scheduler 118 comprises a running execution time counter 204, 208. Upon initiation of execution of the yield operation to the second hardware thread the first hardware thread stores an initiation time value of the running execution time counter 204, 208. Upon completion of execution of the yield operation to the second hardware thread the first hardware thread subtracts the initiation time value from a completion time value to make a determination of the duration of the yield operation.

The OS scheduler 118 upon execution of a yield operation of the processor core 104 between successive OS context switches of the OS 116 by the second hardware thread to the first hardware thread: subtracts from the core utilization counter for the second hardware thread a duration of the yield operation of the processor core 104 between the successive OS context switches by the second hardware thread to the first hardware thread; and adds to the core utilization counter for the first hardware thread the duration of the yield operation of the processor core 104 between the successive OS context switches by the second hardware thread to the first hardware thread. Upon initiation of execution of the yield operation to the first hardware thread the second hardware thread stores an initiation time value of the running execution time counter. Upon completion of execution of the yield operation to the first hardware thread the second hardware thread subtracts the initiation time value from a completion time value to make a determination of the duration of the yield operation to the first hardware thread.

The OS scheduler 118 employs a running execution time counter 204, 208 to make a determination of a length of a time interval between successive OS context switches. The OS scheduler 118 makes an initial determination of utilization of the processor core by the plurality of hardware threads 226, 228, 230 over the time interval through division of the length of the time interval by a total count of the plurality of hardware threads 226, 228, 230 on the processor core. Upon initiation of execution of the yield operation to the second hardware thread the first hardware thread stores an initiation time value of the running execution time counter 204, 208. Upon completion of execution of the yield operation to the second hardware thread the first hardware thread subtracts the initiation time value from a current time value of the running execution time counter 204, 208 to make a determination of the duration of the yield operation. The OS scheduler 118 combines a per-thread result of the initial determination of utilization of the processor core 104 with the core utilization counter for the first hardware thread to make a determination of total core utilization between the successive OS context switches by the first hardware thread. The OS scheduler 118 combines the per-thread result of the initial determination of utilization of the processor core 104 with the core utilization counter for the second hardware thread to make a determination of total core utilization between the successive OS context switches by the second hardware thread.

The first hardware thread executes a multithreaded hardware yield operation of the processor core 104 to effect the utilization yield from the first hardware thread to the second hardware thread between the successive OS context switches of the OS 116. Each of the plurality of hardware threads 226, 228, 230 on the OS 116 between the successive OS context switches independently processes at least a respective software thread. Each of the plurality of hardware threads 226, 228, 230 on the OS 116 between the successive OS context switches independently and substantially simultaneously processes a respective set of software threads 238, 240 242, wherein at least one of the sets of software threads 238, 240 242 comprises a plurality of software threads 238, 240 242.

The plurality of hardware threads 226, 228, 230 comprises at least a first hardware thread and a second hardware thread, wherein the time interval occurs between successive OS context switches of the OS 116. The OS scheduler 118 interprets the determination of processor core utilization 220, 222, 224 as an initial determination of per-thread processor core utilization 220, 222, 224 over the time interval. The OS scheduler 118 makes a determination of a duration of multithreaded hardware yield operations from the first hardware thread to the second hardware thread between the successive OS context switches, through subtraction of an initiation time value stored upon initiation of the multithreaded hardware yield operation from a current time value obtained upon completion of the multithreaded hardware yield operations. The duration of the multithreaded hardware yield operations between the successive OS context switches is subtracted from a core utilization counter for the first hardware thread. The duration of the multithreaded hardware yield operations between the successive OS context switches is added to a core utilization counter for the second hardware thread. The OS scheduler 118 combines the initial determination of per-thread processor core utilization 220, 222, 224 over the time interval with the core utilization counter for the first hardware thread to make a determination of total core utilization between the successive OS context switches by the first hardware thread. The OS scheduler 118 combines the initial determination of per-thread processor core utilization 220, 222, 224 over the time interval with the core utilization counter for the second hardware thread to make a determination of total core utilization between the successive OS context switches by the second hardware thread.

The OS scheduler 118 makes a determination of a duration of multithreaded hardware yield operations from the second hardware thread to the first hardware thread between the successive OS context switches, through subtraction of an initiation time value stored upon initiation of the multithreaded hardware yield operation from the second hardware thread to the first hardware thread, from a current time value obtained upon completion of the multithreaded hardware yield operations. The duration of the multithreaded hardware yield operations from the second hardware thread to the first hardware thread between the successive OS context switches is subtracted from the core utilization counter for the second hardware thread. The duration of the multithreaded hardware yield operations from the second hardware thread to the first hardware thread between the successive OS context switches is added to the core utilization counter for the first hardware thread. The OS scheduler 118 combines the initial determination of per-thread processor core utilization 220, 222, 224 over the time interval with the core utilization counter for the first hardware thread to make a determination of total core utilization between the successive OS context switches by the first hardware thread. The OS scheduler 118 combines the initial determination of per-thread processor core utilization 220, 222, 224 over the time interval with the core utilization counter for the second hardware thread to make a determination of total core utilization between the successive OS context switches by the second hardware thread.

An implementation of the apparatus 100 in an example comprises a plurality of components such as one or more of electronic components, mechanical components, hardware components, and/or computer software components. A number of such components can be combined or divided in an implementation of the apparatus 100. An exemplary component of an implementation of the apparatus 100 employs and/or comprises a set and/or series of computer instructions written in or implemented with any of a number of programming languages, as will be appreciated by those skilled in the art.

An implementation of the apparatus 100 in an example encompasses an article. The article comprises one or more computer-readable signal-bearing media. The article comprises means in the one or more media for one or more exemplary and/or desirable functions, approaches, and/or procedures.

An implementation of the apparatus 100 in an example employs one or more computer readable signal bearing media. A computer-readable signal-bearing medium in an example stores software, firmware and/or assembly language for performing one or more portions of one or more implementations. An example of a computer-readable signal bearing medium for an implementation of the apparatus 100 comprises the recordable data storage medium of the memory 106 and/or storage 108. A computer-readable signal-bearing medium for an implementation of the apparatus 100 in an example comprises one or more of a magnetic, electrical, optical, biological, and/or atomic data storage medium. For example, an implementation of the computer-readable signal-bearing medium comprises one or more floppy disks, magnetic tapes, CDs, DVDs, hard disk drives, and/or electronic memory. In another example, an implementation of the computer-readable signal-bearing medium comprises a modulated carrier signal transmitted over a network comprising or coupled with an implementation of the apparatus 100, for instance, one or more of a telephone network, a local area network ("LAN"), a wide area network ("WAN"), the Internet, and/or a wireless network.

The steps or operations described herein are examples. There may be variations to these steps or operations without departing from the spirit of the invention. For example, the steps may be performed in a differing order, or steps may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, comprising:
    monitoring multithreaded hardware yield operations from a first hardware thread of a processor core to a second hardware thread of the processor core;
    determining utilization of a processor core by the first and second hardware threads over a time interval;
    determining a duration of the multithreaded hardware yield operations through subtraction of an initiation time value stored upon initiation of the multithreaded hardware yield operations from a completion time value obtained upon completion of the multithreaded hardware yield operations;

subtracting the duration of the multithreaded hardware yield operations from a core utilization counter for the first hardware thread; and combining the utilization of the processor core over the time interval with the core utilization counter for the first hardware thread to determine total core utilization during the time interval by the first hardware thread.

2. The method of claim 1, wherein one or more hardware thread context switches among the first and second hardware threads occur over the time interval, wherein determining utilization of the processor core comprises interpreting a result of a division of the time interval by a total count of the first and second hardware threads as a per-thread processor core utilization.

3. The method of claim 1, wherein one or more hardware thread context switches for utilization of a single processor core including the first and second hardware threads occur among the first and second hardware threads over a time interval, wherein determining utilization of the processor core comprises determining utilization of the single processor core by the first and second hardware threads over the time interval by dividing the time interval by a total count of the first and second hardware threads.

4. The method of claim 1, wherein determining utilization of the processor core comprises:
   determining utilization of the processor core by the first and second hardware threads over the time interval through division of the time interval by two, the method further comprising:
      processing at least a first software thread independently by the first hardware thread during the time interval; and
      processing at least a second software thread independently by the second hardware thread during the time interval.

5. The method of claim 1, wherein the time interval occurs between successive operating system (OS) context switches of the OS, wherein one or more hardware thread context switches for utilization of the processor core occur among the first and second hardware threads over the time interval, wherein determining utilization of the processor core comprises determining utilization of the processor core by the first and second hardware threads between the successive OS context switches and over the one or more hardware thread context switches by dividing a length of time between the successive OS context switches by a total count of the first and second hardware threads on the OS of the processor core.

6. The method of claim 1, wherein one or more hardware thread context switches among the first and second hardware threads occur over the time interval, wherein determining utilization of the processor core comprises dividing a length of the time interval by total count of a plurality of hardware threads including the first and second hardware threads to determine utilization of the processor core as a substitute for employment of one or more absent, unselected, or unavailable per-hardware thread interval time counters that would otherwise be employable to individually measure utilization of the processor core by each of the plurality of hardware threads.

7. The method of claim 1, wherein the time interval occurs between successive operating system (OS) context switches, and further comprising:
   combining the utilization of the processor core over the time interval with a core utilization counter for the second hardware thread to determine total core utilization between the successive OS context switches by the second hardware thread.

8. The method of claim 7, further comprising:
monitoring multithreaded hardware yield operations from the second hardware thread to the first hardware thread between the successive OS context switches;

determining the duration of the multithreaded hardware yield operations from the second hardware thread to the first hardware thread through subtraction of the initiation time value stored upon initiation of the multithreaded hardware yield operations from the second hardware thread to the first hardware thread, from the completion time value obtained upon completion of the multithreaded hardware yield operations from the second hardware thread to the first hardware thread;

subtracting the duration of the multithreaded hardware yield operations from the second hardware thread to the first hardware thread, from the core utilization counter between the successive OS context switches for the second hardware thread;

adding the duration of the multithreaded hardware yield operations from the second hardware thread to the first hardware thread to the core utilization counter between the successive OS context switches for the first hardware thread;

combining a duration of processor core utilization over the time interval by the first hardware thread with the core utilization counter for the first hardware thread to determine total core utilization between the successive OS context switches by the first hardware thread; and combining a duration of processor core utilization over the time interval by the second hardware thread with the core utilization counter for the second hardware thread to determine total core utilization between the successive OS context switches by the second hardware thread.

9. An apparatus, comprising:
a processor core to execute a plurality of hardware threads; and
an operating system (OS) scheduler of an OS for the processor core, the OS scheduler to:
   monitor multithreaded hardware yield operations from a first hardware thread of the plurality of hardware threads to a second hardware thread of the plurality of hardware threads;
   determine a duration of at least one yield operation through subtraction of an initiation time value stored upon initiation of the at least one yield operation from a completion time value obtained upon completion of the at least one yield operation;
   subtract, from a core utilization counter for the first hardware thread, the duration of at least one yield operation of the processor core from the first hardware thread to the second hardware thread; and
   add to a core utilization counter for the second hardware thread the duration of the at least one yield operation of the processor core.

10. The apparatus of claim 9, wherein the OS scheduler is to:
subtract, from the core utilization counter for the second hardware thread, the duration of the at least one yield operation of the processor core from the second hardware thread to the first hardware thread; and
add to the core utilization counter for the first hardware thread the duration of the at least one yield operation of the processor core from the second hardware thread to the first hardware thread.

11. The apparatus of claim 9, wherein the OS scheduler comprises a running execution time counter, the first hardware thread to store the initiation time value of the running execution time counter when execution of the at least one yield operation to the second hardware thread is initiated and to subtract the initiation time value from the completion time value when execution of the at least one yield operation to the second hardware thread is completed to determine the duration of the at least one yield operation.

12. The apparatus of claim 11, wherein the OS scheduler is to:
subtract from the core utilization counter for the second hardware thread a duration of the at least one yield operation of the processor core from the second hardware thread to the first hardware thread; and
add to the core utilization counter for the first hardware thread the duration of the at least one yield operation of the processor core from the second hardware thread to the first hardware thread, the second hardware thread to store an initiation time value of the running execution time counter when execution of the at least one yield operation to the first hardware thread is initiated and to subtract the initiation time value from a completion time value when execution of the at least one yield operation to the first hardware thread is completed to determine the duration of the at least one yield operation to the first hardware thread.

13. The apparatus of claim 9, wherein the OS scheduler is to:
determine a length of a time interval between successive OS context switches using a running execution time counter;
determine utilization of the processor core by the first and second hardware threads over the time interval by dividing the length of the time interval by a total count of the plurality of hardware threads on the processor core;
combine a per-thread result of an initial determination of utilization of the processor core with the core utilization counter for the first hardware thread to determine total core utilization between the successive OS context switches by the first hardware thread; and
combine the per-thread result of the initial determination of utilization of the processor core with the core utilization counter for the second hardware thread to determine total core utilization between the successive OS context switches by the second hardware thread, the first hardware thread to store an initiation time value of the running execution time counter when execution of the at least one yield operation to the second hardware thread is initiated and to store a completion time value of the running execution time counter when execution of the at least one yield operation to the second hardware thread is completed.

14. The apparatus of claim 9, wherein the first hardware thread executes a multithreaded hardware yield operation of the processor core to effect the yield from the first hardware thread to the second hardware thread between successive OS context switches of the OS.

15. The apparatus of claim 9, wherein each of the plurality of hardware threads on the OS is to independently process at least a respective software thread.

16. The apparatus of claim 9, wherein each of the plurality of hardware threads on the OS switches independently and substantially simultaneously processes a respective set of software threads, at least one of the sets of software threads comprising a plurality of software threads.

17. An apparatus, comprising:
a processor core to execute a plurality of hardware threads; and
an operating system (OS) scheduler of an OS for the processor core to:
identify multithreaded hardware yield operations from a first hardware thread of the plurality of hardware threads to a second hardware thread of the plurality of hardware threads;
determine utilization of the processor core by the first and second hardware threads over a time interval;
determine a duration of the multithreaded hardware yield operations through subtraction of an initiation time value stored upon initiation of the multithreaded hardware yield operations from a completion time value obtained upon completion of the multithreaded hardware yield operations;
subtract the duration of the multithreaded hardware yield operations from a core utilization counter for the first hardware thread; and
combine the utilization of the processor core over the time interval with the core utilization counter for the first hardware thread to determine total core utilization during the time interval by the first hardware thread.

18. The apparatus of claim 17, wherein the time interval occurs between successive OS context switches of the OS, each of the plurality of hardware threads on the OS between the successive OS context switches to independently and substantially simultaneously process a respective set of software threads, at least one of the sets of software threads comprising a plurality of software threads.

19. The apparatus of claim 17, wherein the time interval occurs between successive OS context switches of the OS, the OS scheduler to:
interpret utilization of the processor core as an initial determination of per-thread processor core utilization over the time interval;
determine the duration of multithreaded hardware yield operations from the first hardware thread to the second hardware thread between the successive OS context switches; and
combine the initial determination of per-thread processor core utilization over the time interval with a core utilization counter for the second hardware thread to determine total core utilization between the successive OS context switches by the second hardware thread.

20. The apparatus of claim 19, wherein the OS scheduler is to:
determine a duration of multithreaded hardware yield operations from the second hardware thread to the first hardware thread between the successive OS context switches by subtracting an initiation time value stored upon initiation of the multithreaded hardware yield operation from the second hardware thread to the first hardware thread, from a current time value obtained upon completion of the multithreaded hardware yield operations;
subtract the duration of the multithreaded hardware yield operations from the second hardware thread to the first hardware thread between the successive OS context switches is subtracted from the core utilization counter for the second hardware thread;
add the duration of the multithreaded hardware yield operations from the second hardware thread to the first hardware thread between the successive OS context switches is added to the core utilization counter for the first hardware thread;

combine the initial determination of per-thread processor core utilization over the time interval with the core utilization counter for the first hardware thread to determine total core utilization between the successive OS context switches by the first hardware thread; and combine the initial determination of per-thread processor core utilization over the time interval with the core utilization counter for the second hardware thread to determine total core utilization between the successive OS context switches by the second hardware thread.

21. The method of claim 1, further comprising adding the duration of the multithreaded hardware yield operations to a core utilization counter for the second hardware thread.

22. The apparatus of claim 17, wherein the OS scheduler is to add the duration of the multithreaded hardware yield operations to a core utilization counter for the second hardware thread.

* * * * *